US010824866B2

(12) United States Patent
Brosseau et al.

(10) Patent No.: US 10,824,866 B2
(45) Date of Patent: Nov. 3, 2020

(54) SYSTEM, METHOD, AND APPARATUS FOR AUGMENTED REALITY IMPLEMENTATION

(71) Applicant: THE MARKETING STORE WORLDWIDE, LP, Chicago, IL (US)

(72) Inventors: Thomas Brosseau, Schaumburg, IL (US); Brian Fox, Chicago, IL (US)

(73) Assignee: The Marketing Store Worldwife, LP, Chicago, IL (US)

( * ) Notice: Subject to any disclaimer, the term of this patent is extended or adjusted under 35 U.S.C. 154(b) by 27 days.

(21) Appl. No.: 16/006,154

(22) Filed: Jun. 12, 2018

(65) Prior Publication Data

US 2018/0357481 A1    Dec. 13, 2018

Related U.S. Application Data

(60) Provisional application No. 62/518,730, filed on Jun. 13, 2017.

(51) Int. Cl.
*G06K 9/00* (2006.01)
*G06F 3/16* (2006.01)
*G06K 9/22* (2006.01)

(52) U.S. Cl.
CPC ......... *G06K 9/00671* (2013.01); *G06F 3/165* (2013.01); *G06K 9/22* (2013.01)

(58) Field of Classification Search
CPC ........ G06K 9/00671; G06K 9/22; G06K 9/34; G06K 9/00; G06K 9/346; G06F 3/165; G06F 3/16; G06F 3/011; G06F 3/017; G06F 3/0346; G06T 5/00; G06T 7/00; G06T 19/006; H04N 5/262; H04N 5/225; H04N 9/475; H04N 21/234

USPC .................................. 382/103; 348/218.1
See application file for complete search history.

(56) References Cited

U.S. PATENT DOCUMENTS

| 7,030,890 | B1 * | 4/2006 | Jouet | G06F 9/451 |
| | | | | 345/619 |
| 7,268,803 | B1 * | 9/2007 | Murata | G06T 3/4038 |
| | | | | 348/218.1 |
| 8,286,863 | B1 * | 10/2012 | Brooks | G06Q 20/28 |
| | | | | 235/380 |
| 2003/0062413 | A1 * | 4/2003 | Gardiner | G06K 7/10881 |
| | | | | 235/454 |
| 2004/0207836 | A1 * | 10/2004 | Chhibber | G01N 21/9501 |
| | | | | 356/237.4 |

(Continued)

FOREIGN PATENT DOCUMENTS

CN          106023248 A   * 10/2016

*Primary Examiner* — Mahendra R Patel
(74) *Attorney, Agent, or Firm* — Reed Smith LLP; Matthew P. Frederick; Amardeep S. Grewal (57) ABSTRACT

An electronic device, computer-readable medium, and method executed by the electronic device including the steps of activating at least one camera of the electronic device, receiving one or more images of an object comprising at least one graphic printed thereon or embedded therein via the at least one camera, recognizing the at least one graphic within at least one image in the one or more images, determining a pre-programmed output in one or more pre-programmed outputs based at least in part on the recognized at least one graphic, and transmitting the pre-programmed output via one or more of at least one speaker of the electronic device or the at least one display of the electronic device.

15 Claims, 6 Drawing Sheets

(56) References Cited

U.S. PATENT DOCUMENTS

| | | | |
|---|---|---|---|
| 2007/0091332 A1* | 4/2007 | Nunnink | G06K 7/10732 |
| | | | 358/1.6 |
| 2007/0199996 A1* | 8/2007 | He | G06K 7/12 |
| | | | 235/462.43 |
| 2008/0036873 A1* | 2/2008 | Silver | G06T 7/0002 |
| | | | 348/222.1 |
| 2008/0105749 A1* | 5/2008 | Lei | G06K 7/10722 |
| | | | 235/462.42 |
| 2009/0162554 A1* | 6/2009 | Manico | B29C 44/022 |
| | | | 427/288 |
| 2012/0232976 A1* | 9/2012 | Calman | G06Q 30/02 |
| | | | 705/14.25 |
| 2014/0092005 A1* | 4/2014 | Anderson | G06F 3/011 |
| | | | 345/156 |
| 2015/0073907 A1* | 3/2015 | Purves | G06Q 20/32 |
| | | | 705/14.58 |
| 2015/0139552 A1* | 5/2015 | Xiao | G06T 11/00 |
| | | | 382/195 |
| 2015/0206349 A1* | 7/2015 | Rosenthal | H04N 21/41407 |
| | | | 345/633 |
| 2015/0312633 A1* | 10/2015 | Masciarotte | H04N 21/8173 |
| | | | 725/32 |
| 2017/0013464 A1* | 1/2017 | Fish | H04W 12/06 |
| 2017/0136621 A1* | 5/2017 | Benaim | G06F 3/013 |
| 2018/0012101 A1* | 1/2018 | Mizes | G06K 9/346 |

* cited by examiner

[Store] presents a promotion that only seems like it's from a

SYSTEM, METHOD, AND APPARATUS FOR AUGMENTED REALITY IMPLEMENTATION

RELATED APPLICATION DATA

This application claims priority to U.S. Provisional Application No. 62/518,730 filed Jun. 13, 2017, the disclosure of which is hereby incorporated by reference in its entirety.

BRIEF SUMMARY

The present disclosure relates generally to a system, apparatus, computer-readable medium, and method that enables or facilitates interactive music play, sound creation and/or video or image display on a personal or electronic device. In one particular embodiment, a computer application of a mobile phone can provide augmented reality (AR) disc jockey (DJ) capabilities, for example. The presently disclosed technology can include object recognition switching with interactive audio and/or video feedback.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings various illustrative embodiments. It should be understood, however, that the invention is not limited to the precise arrangements and instrumentalities shown. In the drawings.

DETAILED DESCRIPTION

Certain terminology is used in the following description for convenience only and is not limiting. Certain words used herein designate directions in the drawings to which reference is made. Unless specifically set forth herein, the terms "a," "an" and "the" are not limited to one element, but instead should be read as meaning "at least one." The terminology includes the words noted above, derivatives thereof and words of similar import.

Applicants have discovered a novel system, method, and computer-readable medium for augmented reality implementation.

The disclosed system includes an object having at least one graphic printed thereon or embedded therein and an electronic device comprising at least one camera, at least one speaker or at least one display, one or more processors, and one or more memories operatively coupled to the one or more processors. The one or more memories have computer readable instructions stored thereon which, when executed by at least one of the one or more processors, cause at least one of the one or more processors to perform the steps of: activating the at least one camera; receiving one or more images via the at least one camera; recognizing the at least one graphic within at least one image in the one or more images; determining a pre-programmed output in one or more pre-programmed outputs based at least in part on the recognized at least one graphic; and transmitting the pre-programmed output via one or more of the at least one speaker or the at least one display.

When the at least one graphic comprises a plurality of graphics, at least one of the one or more memories of the system can have further instructions stored thereon that, when executed by at least one of the one or more processors, cause at least one of the one or more processors to perform the steps of: recognizing the plurality of graphics within at least one image in the one or more images, determining a plurality of pre-programmed outputs for the recognized plurality of graphics, each pre-programmed output being determined based at least in part on a corresponding recognized graphic in the recognized plurality of graphics, and transmitting the plurality of pre-programmed outputs via one or more of the at least one speaker or the at least one display in an order of recognition.

When the one or more images comprise a plurality of images, the instructions that, when executed by at least one of the one or more processors, cause at least one of the one or more processors to recognize the plurality of graphics within at least one image in the one or more images can further cause at least one of the one or more processors to: recognize a first graphic within a first image in the plurality of images, the first image corresponding to a first spatial position of the object relative to the electronic device; and recognize a second graphic within a second image in the plurality of images, the second image being taken after the first image and corresponding to a second spatial position of the object relative to the electronic device. For example, a user can move an object (having different graphics or different portions of a single graphic) around relative to the electronic device to interactively affect the augmented reality experience.

The disclosed method is executed by an electronic device and includes the steps of: activating, by the electronic device, at least one camera of the electronic device; receiving, by the electronic device, one or more images of an object comprising at least one graphic printed thereon or embedded therein via the at least one camera; recognizing, by the electronic device, the at least one graphic within at least one image in the one or more images; determining, by the electronic device, a pre-programmed output in one or more pre-programmed outputs based at least in part on the recognized at least one graphic; and transmitting, by the electronic device, the pre-programmed output via one or more of at least one speaker of the electronic device or the at least one display of the electronic device.

When the at least one graphic comprises a plurality of graphics, the disclosed method can further include: recognizing, by the electronic device, the plurality of graphics within at least one image in the one or more images; determining, by the electronic device, a plurality of pre-programmed outputs for the recognized plurality of graphics, each pre-programmed output being determined based at least in part on a corresponding recognized graphic in the recognized plurality of graphics; and transmitting, by the electronic device, the plurality of pre-programmed outputs via one or more of the at least one speaker or the at least one display in an order of recognition.

When the one or more images comprise a plurality of images, the step of recognizing the plurality of graphics within at least one image in the one or more images can include: recognizing a first graphic within a first image in the plurality of images, the first image corresponding to a first spatial position of the object relative to the electronic device; and recognizing a second graphic within a second image in the plurality of images, the second image being taken after the first image and corresponding to a second spatial position of the object relative to the electronic device. For example, a user can move an object (having different graphics or different portions of a single graphic) around relative to the electronic device to interactively affect the augmented reality experience.

The disclosed computer-readable medium is at least one non-transitory computer-readable medium storing computer-readable instructions that, when executed by an electronic device, cause the electronic device to: activate at least one camera of the electronic device; receive one or more images of an object comprising at least one graphic printed thereon or embedded therein via the at least one camera; recognize the at least one graphic within at least one image in the one or more images; determine a pre-programmed output in one or more pre-programmed outputs based at least in part on the recognized at least one graphic; and transmit the pre-programmed output via one or more of at least one speaker of the electronic device or the at least one display of the electronic device.

When the at least one graphic comprises a plurality of graphics, the at least one non-transitory computer-readable medium can further store computer-readable instructions that, when executed by the electronic device, cause the electronic device to: recognize the plurality of graphics within at least one image in the one or more images; determine a plurality of pre-programmed outputs for the recognized plurality of graphics, each pre-programmed output being determined based at least in part on a corresponding recognized graphic in the recognized plurality of graphics; and transmit the plurality of pre-programmed outputs via one or more of the at least one speaker or the at least one display in an order of recognition.

When the one or more images comprise a plurality of images, the instructions that, when executed by the electronic device, cause the electronic device to recognize the plurality of graphics within at least one image in the one or more images can further cause the electronic device to: recognize a first graphic within a first image in the plurality of images, the first image corresponding to a first spatial position of the object relative to the electronic device; and recognize a second graphic within a second image in the plurality of images, the second image being taken after the first image and corresponding to a second spatial position of the object relative to the electronic device. For example, a user can move an object (having different graphics or different portions of a single graphic) around relative to the electronic device to interactively affect the augmented reality experience.

With regard to the above-mentioned system, method, and computer-readable medium, the object having the at least one graphic printed thereon or embedded therein can be any physical object, such as a cup, a sheet of paper, a mug, a magazine, and the like.

With regard to the above-mentioned system, method, and computer-readable medium, the at least one graphic can include, for example, an image, text, a code or barcode such as a two-dimensional bar code, and/or a representation of an audio signal, such as an amplitude, frequency, intensity, etc. The graphic can also be a part of a larger graphic or image. For example, a graphic that wraps around a cup can be interpreted as multiple distinct graphics depending upon which portion of the graphic is captured in an image.

With regard to the above-mentioned system, method, and computer-readable medium, the pre-programmed output can be an audio output and/or a visual output. For example, the pre-programmed output can be a sound, a song, an image, a video, or some combination of these outputs.

With regard to the above-mentioned system, method, and computer-readable medium, the pre-programmed output can be determined based at least in part on the recognized at least one graphic and one or more user inputs into the electronic device. For example, the position of the electronic device can be detected, such as via an accelerometer within the device. This position can then be considered an input and used in conjunction with the recognized graphic to determine a pre-programmed output. In this case, movement of the electronic can be used to determine a new pre-programmed output even when the recognized at least one graphic remains static.

With regard to the above-mentioned system, method, and computer-readable medium, the electronic device can include a device having the requisite features, such as a mobile phone or smartphone, a tablet, a smart watch, augmented reality glasses or goggles, a computer, and/or a digital camera.

Referring to the drawings in detail, wherein like reference numerals indicate like elements throughout, FIGS. 1-6 illustrate a system, apparatus and/or method designed to enable, facilitate or produce sound (e.g., music) and/or one or more visuals (e.g., video) on or in a first device or object in response to recognizing the presence and/or movement of one or more images of a second device or object. The presently disclosed technology can include or be run from a personal or electronic device, such as a hand-held mobile or smart phone, having a program or application thereon or accessible thereto. The application can recognize one or more images on or embedded in the second object, which can be separate and/or spaced-apart from the electronic device, and then generate responses thereto.

In one embodiment, the presently disclosed technology includes an innovative smart phone interactive experience involving at least one graphic wrapped around an object, such as a drinking cup, or displaced on an object, such as a page in a magazine. When the graphic(s) is/are scanned by the electronic device, at least a portion of the electronic device can become or mimic a circular sound track that can also be sped up, reversed and played with and can mimic a disc jockey spinning records. The one or more graphics can be of a sound wave, for example, that can be scanned and can control the playback of the audio and/or visual response through the app. But the one or more graphics could be any visual (e.g., a photograph or drawing of a door) that can be programmed to control the app sound.

The electronic device, through the application, can provide (via one or more processors or computer devices) on or more responses or actions, such as DJ-like sound control, 3D animated character or environment launching, 3D character training, one or more games or prizes, and/or access to a virtual reality even or concert (e.g., Live Nation partnership video from the first row of a concert).

Referring to FIGS. 1B-1E, in operation of one embodiment of the presently disclosed technology, the user can position the cup so that it is in view of a camera of the mobile phone. The cup can include a "start" glyph (or other trigger or catalyst) that initiates the experience. In one embodiment, the app and/or electronic device can scan a waveform glyph printed around a perimeter of the cup or on a portion of the cup. Through shape recognition, the app and/or electronic device can read the current location along the waveform and use it to control music playing on the mobile phone (e.g., speeding-up the audio, slowing it down, and/or reversing it).

Figure 1A:
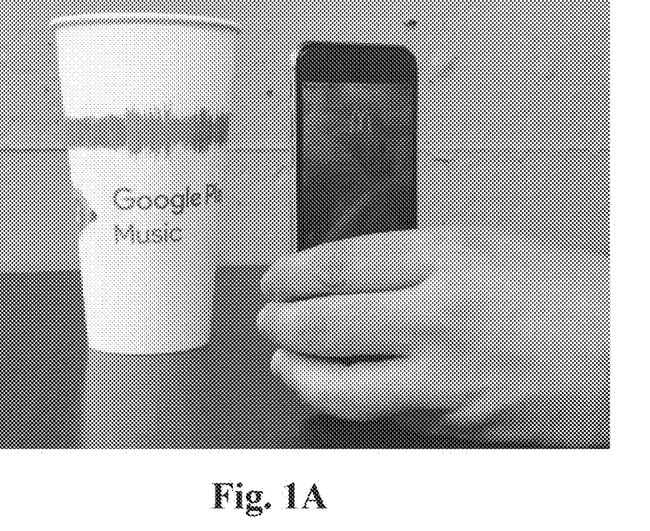
FIG. 1A shows two components of one embodiment of the presently disclosed technology.
Figure 1B:
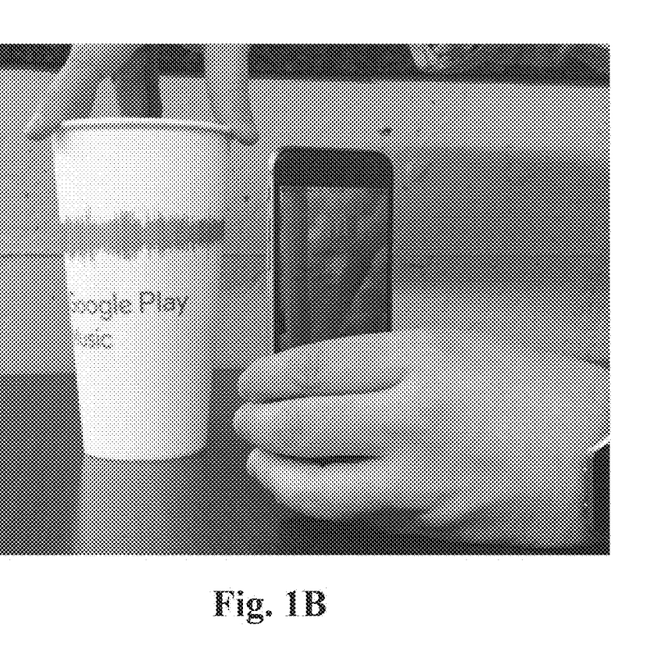
FIG. 1B shows the two components of FIG. 1A in a different configuration.
Figure 1C:
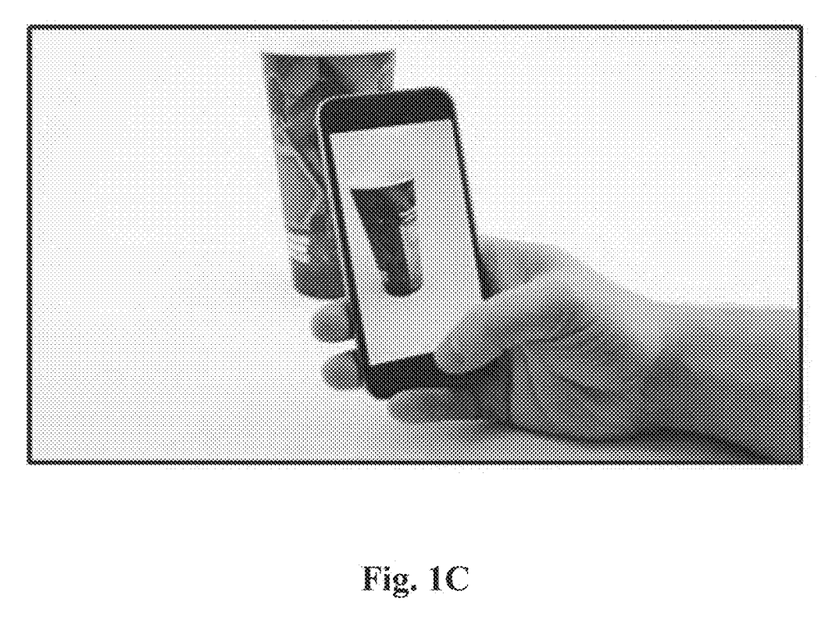
FIG. 1C shows an image of one of the two components on a display of the other component.
Figure 1D:
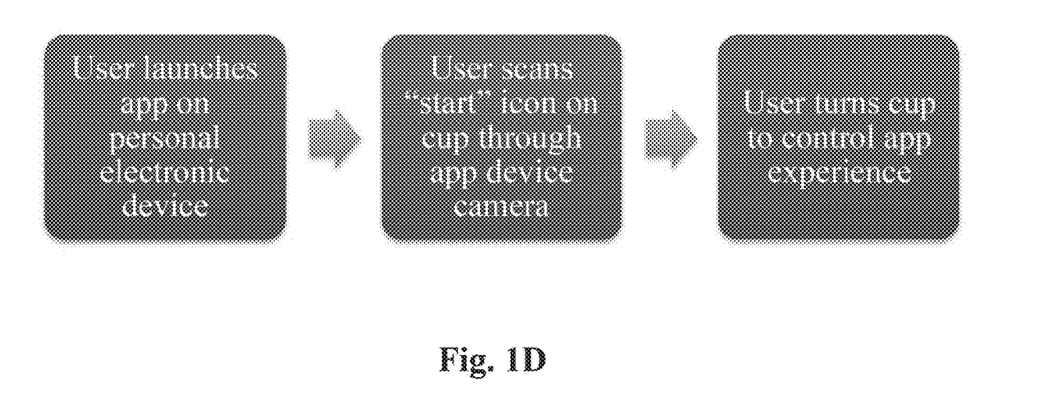
FIG. 1D shows a method of one embodiment of the presently disclosed technology.
Figure 1E:
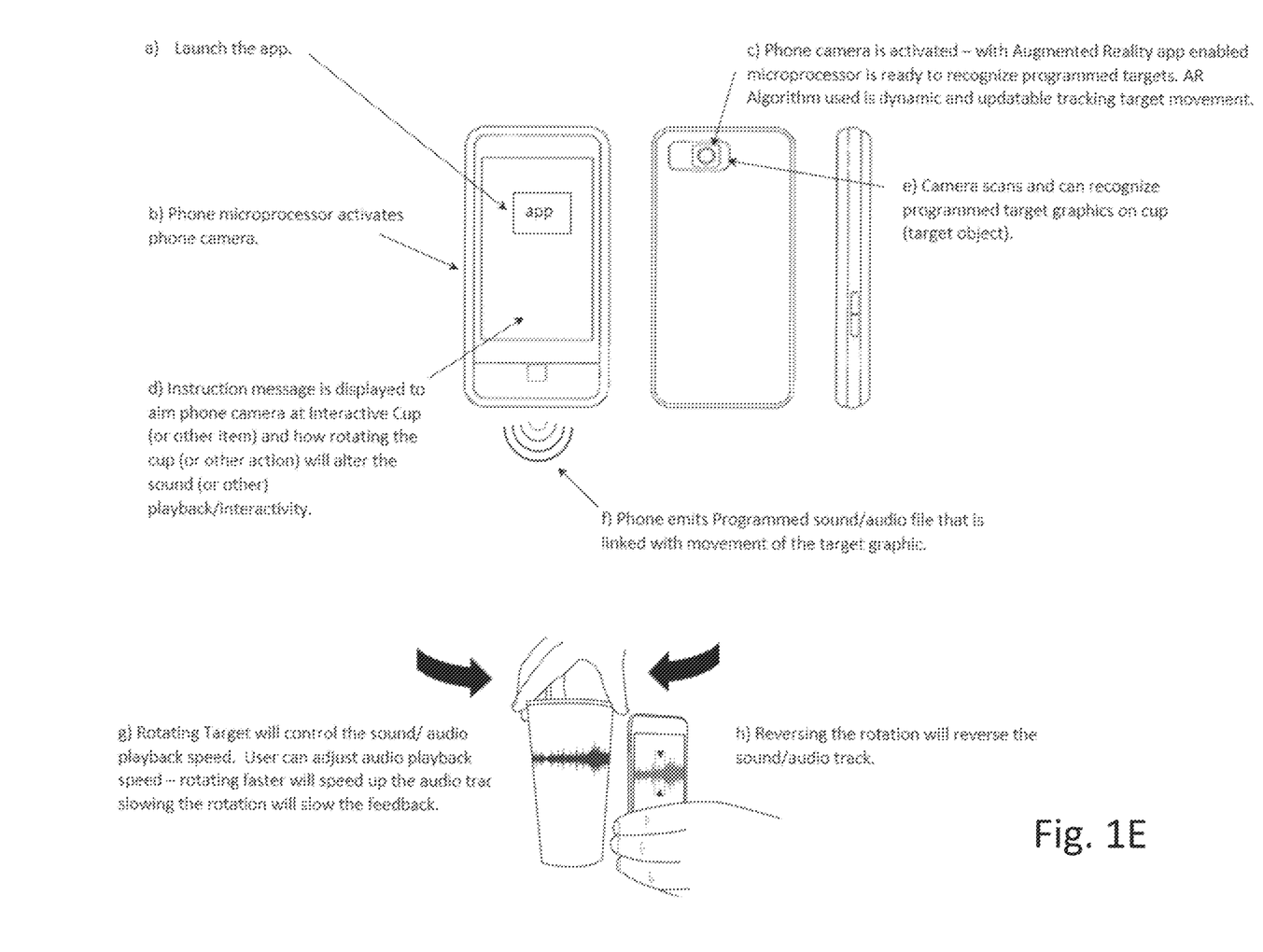
FIG. 1E shows various components of one of the two components and at least certain functionality thereof.
Figure 2:
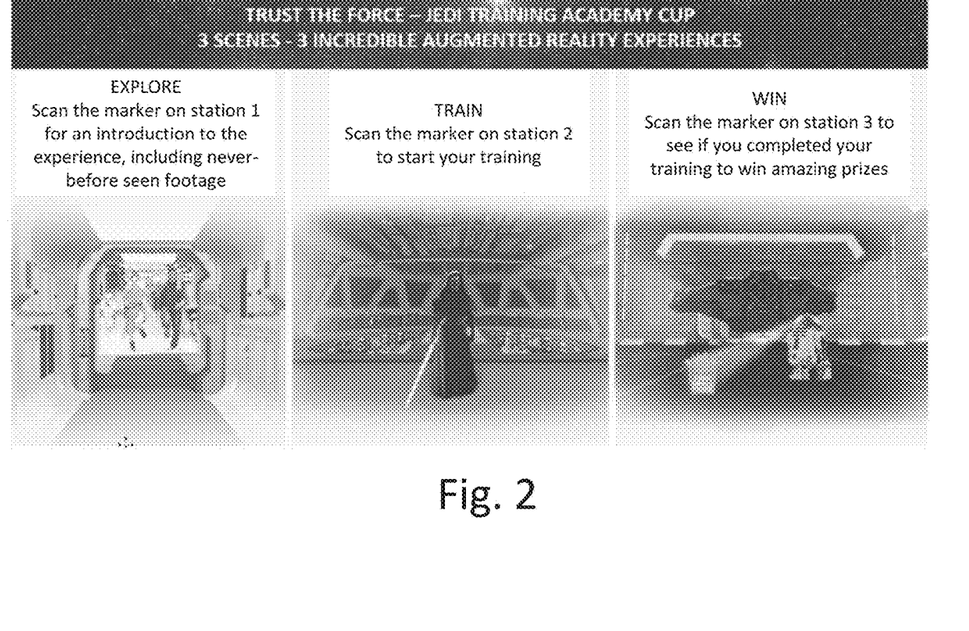
FIG. 2 shows three separate augmented reality scenes that can appear on a display of a personal or electronic device according to the presently disclosed technology.
Figure 3:
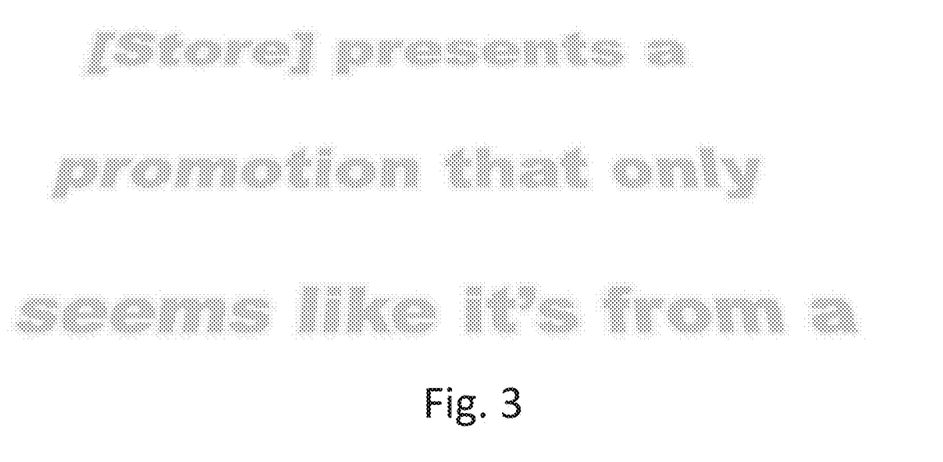
FIG. 3 shows an image or still shot of a video that can appear on the display of the device according to the presently disclosed technology, wherein any words the create or form the image or video can be programmed to display in certain situations.

Referring to FIG. 2, a further extension of this concept is that the app can be programmed to have different trigger targets mapped to the object (e.g., cup) surface that will launch an AR experience, such as a character activation and/or character movement/control. In one embodiment, this AR experience can be linked to a training game or contest, and/or the computing device can display a possible prize or other promotional messaging. One example of a display that can be pre-programmed and show in one or more situations is shown in FIG. 3.

Figure 4:
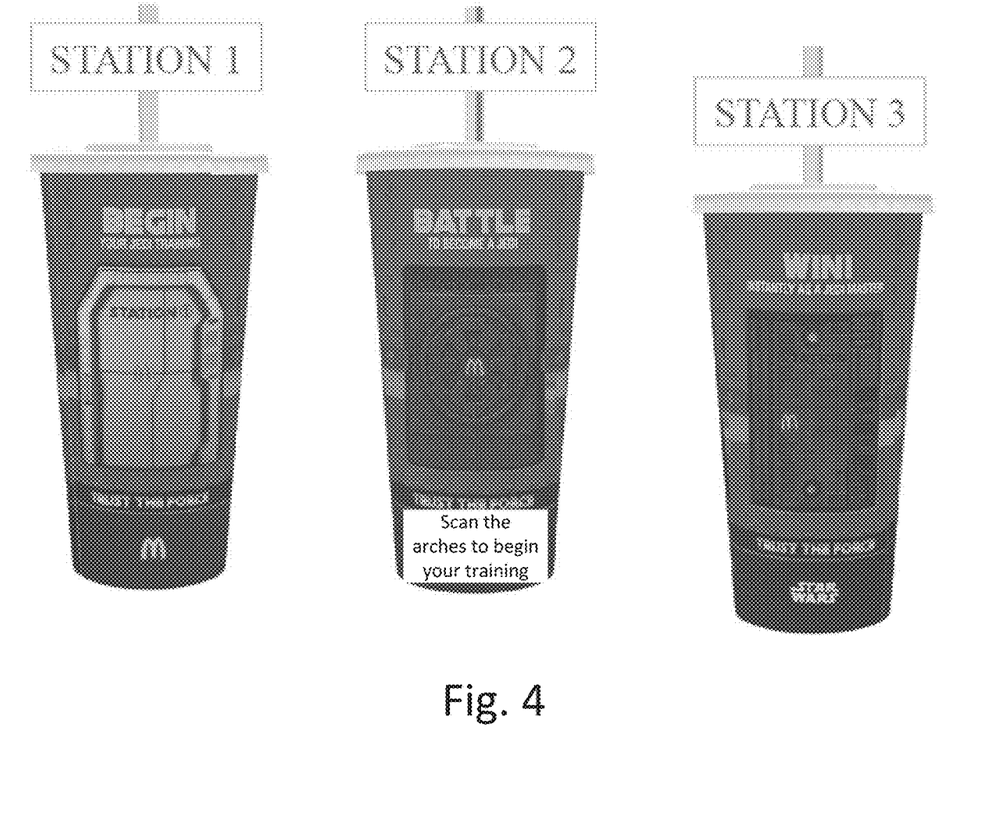
FIG. 4 shows various versions or portions of one component of the presently disclosed technology.
Figure 5:
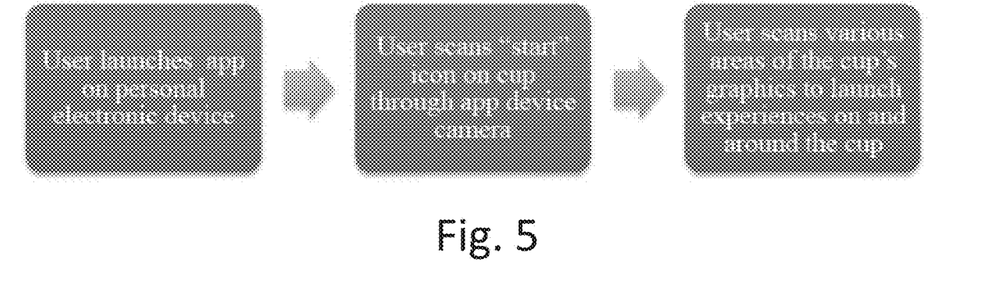
FIG. 5 shows a method of one embodiment of the presently disclosed technology.

Referring to FIGS. 4 and 5, in operation of one embodiment of the presently disclosed technology, the user can position the cup so that it is in view of the camera of the mobile phone. The cup can include a "start" glyph (or other trigger or catalyst that initiates the experience. Using image/glyph recognition, the app and/or electronic device can read images on the cup to launch one or more interactive experiences on and around the cup. For example, in one embodiment, a door printed on the cup can open onscreen of the mobile phone and begin showing a video on the mobile phone within when scanned. Alternatively or additionally, a character printed on the cup can appear to jump-off and come to life onscreen of the mobile phone when scanned. In one embodiment, using image/glyph recognition, the app and/or electronic device can read the position of the cup. By twisting the cup to the right or left, for example, the user can control their AR experience (e.g., controlling an AR character outside of or on top of the cup, such as turning the cup to make the character jump or swing a weapon). It is envisioned that in other embodiments, different movement of the cup (e.g., up and/or down) can create a different experience for the user of the electronic device.

Figure 6:
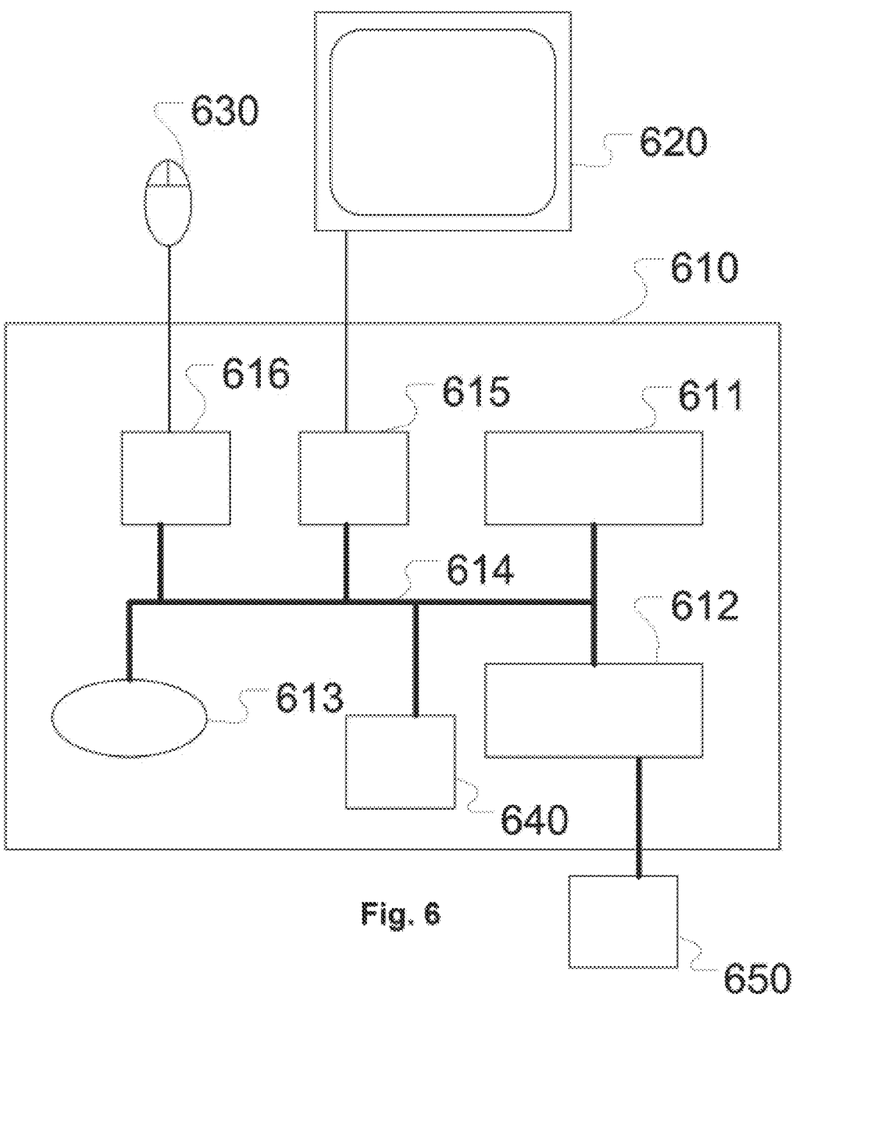
FIG. 6 shows an exemplary computing device useful for performing processes disclosed herein.

One or more of the above-described systems and/or methods may be implemented with or involve software, for example modules executed on or more electronic devices 610 (see FIG. 6). Of course, modules described herein illustrate various functionalities and do not limit the structure or functionality of any embodiments. Rather, the functionality of various modules may be divided differently and performed by more or fewer modules according to various design considerations.

Each electronic device 610 can include one or more processing devices 611 designed to process instructions, for example computer readable instructions (i.e., code), stored in a non-transient manner on one or more storage devices 613. By processing instructions, the processing device(s) 611 may perform one or more of the steps and/or functions disclosed herein. Each processing device may be real or virtual. In a multi-processing system, multiple processing units may execute computer-executable instructions to increase processing power. The storage device(s) 613 may be any type of non-transitory storage device (e.g., an optical storage device, a magnetic storage device, a solid state storage device, etc. The storage device(s) 613 may be removable or non-removable, and includes magnetic disks, magnetic tapes or cassettes, CD-ROMs, CD-RWs, DVDs, or any other medium which can be used to store information. Alternatively, instructions may be stored in one or more remote storage devices, for example storage devices accessed over a network or the internet.

Each electronic device 610 additionally can have memory 612, one or more input controllers 616, one or more output controllers 615, and/or one or more communication connections 640. The memory 612 may be volatile memory (e.g., registers, cache, RAM, etc.), non-volatile memory (e.g., ROM, EEPROM, flash memory, etc.), or some combination thereof. In at least one embodiment, the memory 612 may store software implementing described techniques.

An interconnection mechanism 614, such as a bus, controller or network, may operatively couple components of the computing device 610, including the processor(s) 611, the memory 612, the storage device(s) 613, the input controller(s) 616, the output controller(s) 615, the communication connection(s) 640, and any other devices (e.g., network controllers, sound controllers, etc.). The output controller(s) 615 may be operatively coupled (e.g., via a wired or wireless connection) to one or more output devices 620 (e.g., a monitor, a television, a mobile device screen, a touch-display, a printer, a speaker, etc.) in such a fashion that the output controller(s) 615 can transform the display on the display device 620 (e.g., in response to modules executed). The input controller(s) 616 may be operatively coupled (e.g., via a wired or wireless connection) to an input device 630 (e.g., a mouse, a keyboard, a touch-pad, a scroll-ball, a touch-display, a pen, a game controller, a voice input device, a scanning device, a digital camera, etc.) in such a fashion that input can be received from a user.

The communication connection(s) 640 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

FIG. 6 illustrates the electronic device 610, the output device 620, and the input device 630 as separate devices for ease of identification only. However, the electronic device 610, the display device(s) 620, and/or the input device(s) 630 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). The electronic device 610 may be one or more servers, for example a farm of networked servers, a clustered server environment, or a cloud services running on remote computing devices. A data-source 650 can provide data, such as from one or more external sources, to the device 610. The data-source 650 can be external to the device 610 and can be provided by or coupled to a communication method, such as the Internet.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

The invention claimed is:

1. An electronic device for augmented reality implementation comprising:
   one or more processors; and
   one or more memories operatively coupled to the one or more processors and having computer readable instructions stored thereon which, when executed by at least one of the one or more processors, cause at least one of the one or more processors to:
   activate at least one camera of the electronic device;
   receive a plurality of images of an object via the at least one camera;
   recognize a plurality of graphics within the plurality of images by:
      recognizing a first graphic within a first image in the plurality of images, the first image corresponding to a first spatial position of the object relative to the electronic device; and
      recognizing a second graphic within a second image in the plurality of images, the second image being taken after the first image and corresponding to a second spatial position of the object relative to the electronic device;
   determine a plurality of pre-programmed outputs for the recognized plurality of graphics, each pre-programmed output being determined based at least in part on a corresponding recognized graphic in the recognized plurality of graphics; and
   transmit the plurality of pre-programmed outputs via one or more of at least one speaker of the electronic device or at least one display of the electronic device in an order of recognition.

2. The electronic device of claim 1, wherein the plurality of images of the object comprise a plurality of images of a cup.

3. The electronic device of claim 1, wherein at least one pre-programmed output comprises one or more of an audio output or a visual output.

4. The electronic device of claim 1, wherein at least one pre-programmed output is determined based at least in part on the corresponding recognized graphic and one or more user inputs into the electronic device.

5. The electronic device of claim 1, wherein the electronic device comprises a mobile phone.

6. A method executed by an electronic device for augmented reality implementation, the method comprising:
   activating, by the electronic device, at least one camera of the electronic device;
   receiving, by the electronic device, a plurality of images of an object via the at least one camera;
   recognizing, by the electronic device, a plurality of graphics within the plurality of images by:
      recognizing a first graphic within a first image in the plurality of images, the first image corresponding to a first spatial position of the object relative to the electronic device; and
      recognizing a second graphic within a second image in the plurality of images, the second image being taken after the first image and corresponding to a second spatial position of the object relative to the electronic device;
   determining, by the electronic device, a plurality of pre-programmed outputs for the recognized plurality of graphics, each pre-programmed output being determined based at least in part on a corresponding recognized graphic in the recognized plurality of graphics; and
   transmitting, by the electronic device, the plurality of pre-programmed outputs via one or more of at least one speaker of the electronic device or at least one display of the electronic device.

7. The method of claim 6, wherein the plurality of images of the object comprise a plurality of images of a cup.

8. The method of claim 6, wherein at least one pre-programmed output comprises one or more of an audio output or a visual output.

9. The method of claim 6, wherein at least one pre-programmed output is determined based at least in part on the corresponding recognized graphic and one or more user inputs into the electronic device.

10. The method of claim 6, wherein the electronic device comprises a mobile phone.

11. At least one non-transitory computer-readable medium storing computer-readable instructions that, when executed by an electronic device, cause the electronic device to:
   activate at least one camera of the electronic device;
   receive a plurality of images of an object via the at least one camera;
   recognize a plurality of graphics within the plurality of images by:
      recognizing a first graphic within a first image in the plurality of images, the first image corresponding to a first spatial position of the object relative to the electronic device; and
      recognizing a second graphic within a second image in the plurality of images, the second image being taken after the first image and corresponding to a second spatial position of the object relative to the electronic device;
   determine a plurality of pre-programmed outputs for the recognized plurality of graphics, each pre-programmed output being determined based at least in part on a corresponding recognized graphic in the recognized plurality of graphics; and
   transmit the plurality of pre-programmed outputs via one or more of at least one speaker of the electronic device or at least one display of the electronic device.

12. The at least one non-transitory computer-readable medium of claim 11, wherein the plurality of images of the object comprise a plurality of images of a cup.

13. The at least one non-transitory computer-readable medium of claim 11, wherein at least one pre-programmed output comprises one or more of an audio output or a visual output.

14. The at least one non-transitory computer-readable medium of claim 11, wherein at least one pre-programmed output is determined based at least in part on the corresponding recognized graphic and one or more user inputs into the electronic device.

15. The at least one non-transitory computer-readable medium of claim 11, wherein the electronic device comprises a mobile phone.

* * * * *